United States Patent
Schinzler et al.

(10) Patent No.: US 11,237,974 B2
(45) Date of Patent: Feb. 1, 2022

(54) OPERATION CACHE COMPRESSION

(71) Applicant: Arm Limited, Cambridge (GB)

(72) Inventors: Michael Brian Schinzler, Round Rock, TX (US); Michael Filippo, Austin, TX (US)

(73) Assignee: Arm Limited, Cambridge (GB)

( * ) Notice: Subject to any disclaimer, the term of this patent is extended or adjusted under 35 U.S.C. 154(b) by 91 days.

(21) Appl. No.: 16/552,001

(22) Filed: Aug. 27, 2019

(65) Prior Publication Data

US 2021/0064533 A1    Mar. 4, 2021

(51) Int. Cl.
*G06F 12/0875* (2016.01)
*G06F 9/30* (2018.01)
*G06F 9/28* (2006.01)

(52) U.S. Cl.
CPC .......... *G06F 12/0875* (2013.01); *G06F 9/28* (2013.01); *G06F 9/30156* (2013.01); *G06F 9/3016* (2013.01); *G06F 9/30047* (2013.01); *G06F 2212/401* (2013.01); *G06F 2212/453* (2013.01)

(58) Field of Classification Search
None
See application file for complete search history.

(56) References Cited

U.S. PATENT DOCUMENTS

| | | | | |
|---|---|---|---|---|
| 7,010,665 B1* | 3/2006 | Toll | ..................... | G06F 9/30003 711/215 |
| 7,095,342 B1* | 8/2006 | Hum | ................... | H03M 7/3084 341/51 |
| 7,389,408 B1* | 6/2008 | Nelson | ................ | G06F 9/30149 712/300 |
| 7,827,355 B1* | 11/2010 | Muthusamy | ............ | G06F 9/382 711/125 |
| 2001/0002483 A1* | 5/2001 | Roberts | ............... | G06F 9/30178 712/210 |
| 2014/0258687 A1* | 9/2014 | Tan | ..................... | G06F 9/30036 712/217 |
| 2019/0188142 A1* | 6/2019 | Rappoport | ............ | G06F 9/3017 |
| 2020/0019406 A1* | 1/2020 | Kalamatianos | ..... | G06F 9/30145 |
| 2020/0285466 A1* | 9/2020 | Kotra | .................... | G06F 9/3818 |

FOREIGN PATENT DOCUMENTS

GB    2489243 A * 9/2012    ........... G06F 9/3851

OTHER PUBLICATIONS

Patterson et al. Computer Organization and Design. 2014. Morgan Kaufmann. 5th ed. pp. 509-515.*

* cited by examiner

*Primary Examiner* — Nathan Sadler
(74) *Attorney, Agent, or Firm* — Nixon & Vanderhye P.C.

(57) ABSTRACT

A data processing apparatus is provided. The data processing apparatus includes fetch circuitry to fetch instructions from storage circuitry. Decode circuitry decodes each of the instructions into one or more operations and provides the one or more operations to one or more execution units. The decode circuitry is adapted to decode at least one of the instructions into a plurality of operations. Cache circuitry caches the one or more operations and at least one entry of the cache circuitry is a compressed entry that represents the plurality of operations.

12 Claims, 7 Drawing Sheets

FIG. 6

OPERATION CACHE COMPRESSION

TECHNICAL FIELD

The present disclosure relates to data processing. More particularly, it relates to caches.

DESCRIPTION

In a data processing apparatus, instructions can be decoded to produce one or more operations, macro-operations and/or micro-operations (hereinafter referred to as simply "operations"). The operations that are produced can be cached so as to save the decoding process being repeatedly performed. However, such caches are limited in size and so may not be used for instructions that generate a large number of operations, such as gather and scatter instructions.

SUMMARY

Viewed from a first example configuration, there is provided a data processing apparatus comprising: fetch circuitry to fetch instructions from storage circuitry; decode circuitry to decode each of the instructions into one or more operations and to provide the one or more operations to one or more execution units, wherein the decode circuitry is adapted to decode at least one of the instructions into a plurality of operations; and cache circuitry to cache the one or more operations, wherein at least one entry of the cache circuitry is a compressed entry that represents the plurality of operations.

Viewed from a second example configuration, there is provided a data processing method comprising: fetching instructions from storage circuitry; decoding each of the instructions into one or more operations, wherein the decoding decodes at least one of the instructions into a plurality of operations; providing the one or more operations to one or more execution units; and caching the one or more operations in cache circuitry, wherein at least one entry of the cache circuitry is a compressed entry that represents the plurality of operations.

Viewed from a third example configuration, there is provided a data processing apparatus comprising: means for fetching instructions from storage circuitry; means for decoding each of the instructions into one or more operations, wherein the decoding decodes at least one of the instructions into a plurality of operations; means for providing the one or more operations to one or more execution units; and means for caching the one or more operations, wherein at least one entry of the means for caching is a compressed entry that represents the plurality of operations.

BRIEF DESCRIPTION OF THE DRAWINGS

The present invention will be described further, by way of example only, with reference to embodiments thereof as illustrated in the accompanying drawings, in which:

FIG. 6 illustrates changes in scheduling that occur when using the compressed mop-cache entries in accordance with some embodiments.

DESCRIPTION OF EXAMPLE EMBODIMENTS

Figure 1:
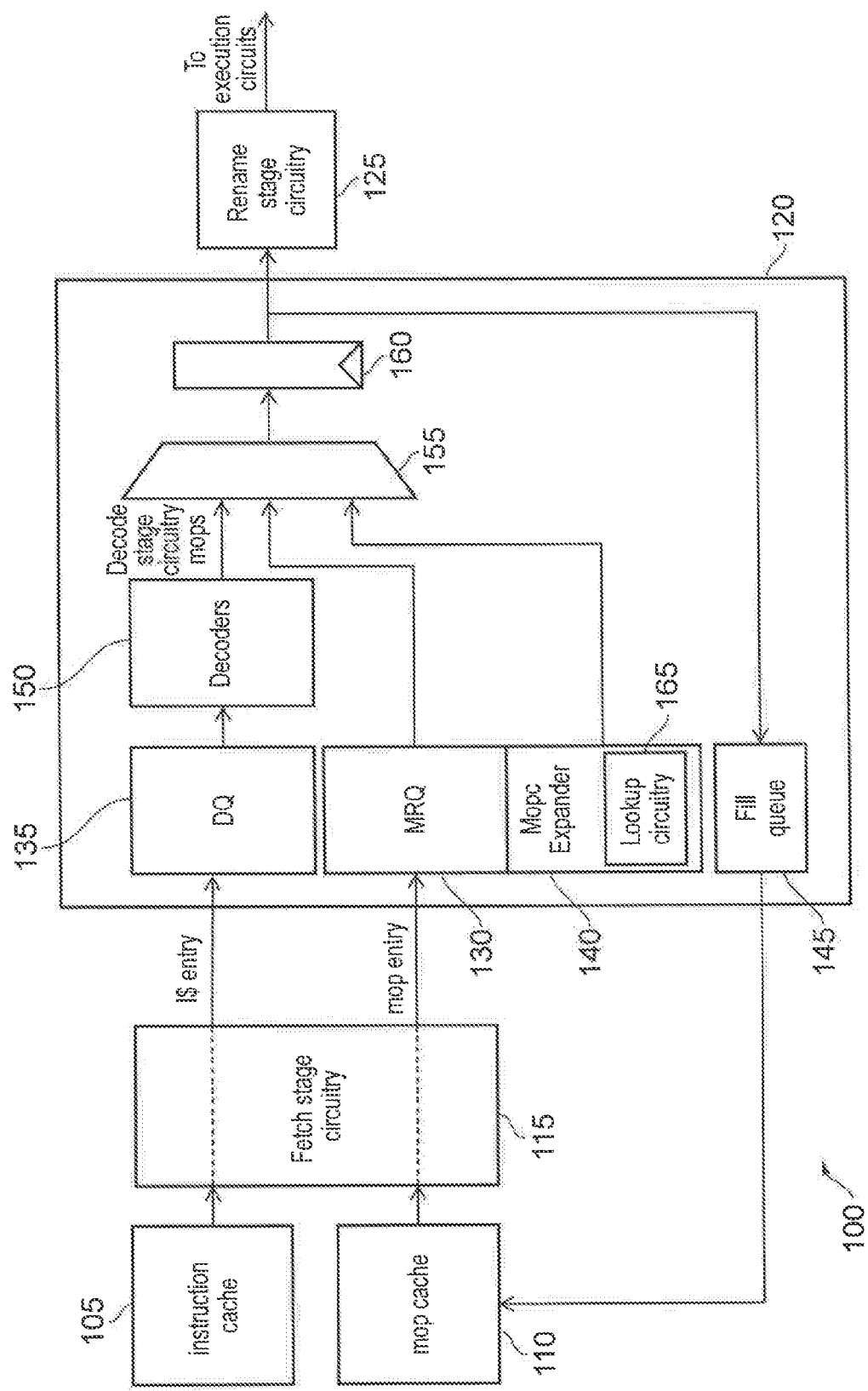
FIG. 1 schematically illustrates a data processing apparatus in accordance with some embodiments.

Before discussing the embodiments with reference to the accompanying figures, the following description of embodiments is provided.

In accordance with the first example configuration there is provided fetch circuitry to fetch instructions from storage circuitry; decode circuitry to decode each of the instructions into one or more operations and to provide the one or more operations to one or more execution units, wherein the decode circuitry is adapted to decode at least one of the instructions into a plurality of operations; and cache circuitry to cache the one or more operations, wherein at least one entry of the cache circuitry is a compressed entry that represents the plurality of operations.

The fetch circuitry fetches the instructions from the storage circuitry. The storage circuitry could be a main memory (e.g. DRAM) or could be a cache that is designed to store instructions once they have been obtained from the main memory. Having fetched the instructions, they are passed to the decode circuitry that decodes the instructions into one or more operations. Here, the operations could be, for instance, macro-operations or micro-operations. In any event, having decoded the instruction into one or more operations (of whatever kind), those operations are passed to execution units for execution. Note that the operations could be passed to the execution units indirectly, e.g. via rename circuitry or other stages of a pipeline. Cache circuitry is provided in order to cache the one or more operations after having been decoded by the decode circuitry. Although each of the instructions will be decoded into one or more operations, at least some of the instructions are such that they will be decoded into a plurality of operations. At least one entry in the cache circuitry is a compressed entry. A single compressed entry is able to represent the plurality of operations that are decoded from a single instruction. In this way, even though an instruction may generate a large number of operations, it is possible to use a compressed entry in order to represent all of those operations.

In some examples, the operations are macro-operations. A macro-operation can be considered to be the degenerated result of decoding an instruction. In some examples, the macro-operations can be further broken down into micro-operations and the operations are these micro-operations. In some embodiments, the operations comprise any combination of operations, macro-operations, and/or micro-operations. In any event, the (micro/macro) operations tend to be directed towards a single execution unit, with an instruction decoding into one or more (micro/macro) operations.

In some examples, the data processing apparatus comprises expansion circuitry to expand the compressed entry into the plurality of operations and to provide the plurality of operations to the execution units. The expansion circuitry is thereby able to "replay" the instruction such that the operations that are produced as a consequence of decoding that instruction are regenerated from the compressed entry. The operations can then be provided to the execution units as would occur when the instruction is first decoded.

In some examples, the one or more operations are provided to the execution units via a plurality of lanes; and the expansion circuitry is adapted to provide the plurality of operations to at least a subset of the plurality of lanes. As previously explained, the one or more operations need not be provided to the execution units directly. In these embodiments, the operations are provided to the execution units via a plurality of lanes. Such lanes could be used as part of a register rename process. Lanes may also be used in the form of queues to a later part of a pipeline such as a rename stage or an execution stage via the execution circuits.

In some examples, the expansion circuitry inserts each of the plurality of operations into the subset of the plurality of lanes in a predetermined order. For example, for an instruction that's generates nine operations, the predetermined order could be such that the first operation is inserted into the first of the plurality of lanes, the second operation is inserted into the second of the plurality of lanes, and so on. This ordering is independent of the current occupancy or status of those lanes. In particular, in these embodiments, the operations cannot be reordered. By inhibiting reordering of the operations, it is possible to simplify the expansion circuitry. In particular, expansion circuitry in one lane need not be concerned with how the compressed entry is expanded for other lanes. Instead, the expansion circuitry only needs to be concerned with how the expansion causes an operation to be generated at its own lane.

In some examples, the expansion circuitry inserts each of the plurality of operations into a subset of the plurality of lanes. Although, in some embodiments, all of the lanes are used by the expansion circuitry, in other embodiments, only some of the lanes are used in the expansion of the compressed entry. This is particularly important where the lanes relate to circuitry that has limited resource available. Such limited usage of lanes can be helpful in preventing over usage or attempted over usage of that resource.

For example, the lanes may be connected to rename circuitry; and a size of the subset may be defined by a number of rename operations that can be simultaneously performed by the rename circuitry across the lanes. Rename circuitry can be used in order to help reduce or eliminate data dependencies between operations. Typically this can be achieved by "renaming" registers where no real dependency between those registers exists. However, this process can be complicated and rename circuitry may be such that only a limited number of rename operations can be carried out simultaneously. Consequently, the number of lanes used for expansion of the compressed entry could be limited based on the number of lanes that can be simultaneously renamed by the rename circuitry. In other examples, the circuitry to which the lanes are attached may have a limited number of ports available with which to receive input. In these examples, the number of the lanes that are used for expansion may be limited to or correspond with the number of ports that are available to that circuitry. In this way, the act of performing expansion does not create a set of operations that would over use the resource (i.e. by attempting to use too many ports simultaneously). If this were to occur, it is likely that the expansion of the compressed entry would be stalled to enable the resource to be provisioned.

In some examples, the data processing apparatus comprises control circuitry to control entry to those of the lanes not in the subset according to the number of rename operations that can be simultaneously performed by the rename circuitry and a number of rename operations necessitated by the plurality of operations. For those lanes that are not in the subset (e.g. those lanes that are not subject to expansion of the compressed entry), control circuitry may be provided in order to control entry to those lanes of other operations not related to the compressed entry. For example, during expansion of a compressed entry, some of the lanes may remain unused by the expansion process. These lanes could be used in order to pass other operations to the rename circuitry. In practice, the entry into these lanes will depend on the extent to which the rename circuitry is being used by the expanded entries by the macro-operations making up the compressed entry. For instance, if none of the operations that make up the compressed entry make use of rename procedures (for example as may be the case with branch operations) then entry into the remaining lanes may be permitted. If, however, all of the lanes have operations inserted that make use of the rename circuitry, an entry into the remaining lanes by an operation may be prohibited.

In some examples, the compressed entry comprises a compressed entry identifier to indicate that the compressed entry is to be expanded by the expansion circuitry; and the compressed entry comprises a compression opcode that corresponds with the plurality of operations. The compressed entry identifier is used to indicate that a compressed entry is a compressed entry and is therefore to be expanded by the expansion circuitry. The identifier may be made up of multiple parts. For example, the identifier could simply be a bit or a series of bits within the compressed entry that mark the entry as a compressed entry. However, the bits need not be contiguous and instead, the identifier could be a combination or one of several combination of bits. The compression opcode is used to indicate the plurality of operations that are to be generated when the compressed entry is expanded.

In some examples, the expansion circuitry comprises lookup circuitry to store a correspondence between the compression opcode and the plurality of operations. By using the opcode in combination with the lookup circuitry, it is possible to determine the plurality of operations. Note that in some embodiments, such as where the expansion circuitry is specific to each individual lane, the lookup circuitry may also be lane specific. That is, the expansion circuitry at a particular lane may use its individual lookup circuitry to determine the operation that it should generate, given its lane number, and given the compression opcode. In some examples, the lookup circuitry may also consider the cycle number if, for instance, the number of operations to be generated is larger than the number of lanes available for expansion. In particular, if the compressed entry represents X operations, and only Y lanes are available (Y<X), then multiple cycles will be necessary in order to generate the plurality of operations.

In some examples, the compressed entry comprises opcodes of the plurality of operations in a compressed form. As an alternative to providing simply an opcode, the compressed entry could include the opcodes of the operations themselves in a compressed form. A number of appropriate compression techniques will be known to the skilled person. For instance, Huffman coding can be used for compressing the opcodes. By using a compression algorithm in order to generate the compressed form, it is possible for arbitrary sequences of operations to be compressed.

In some examples, a length of an uncompressed entry of the cache circuitry is the same as a length of the compressed entry in the cache circuitry. The number of bits used to represent an entry of the cache is therefore the same number of bits as is used to represent the compressed entry. In other words, the compressed entries are no larger or smaller than the non-compressed entries.

Although the compressed entries could be used to represent any instruction, in some examples, the at least one of the instructions relates to a plurality of memory locations. Instructions that relate to a plurality of memory locations are likely to result in a large number of operations being generated. Consequently, such instructions are likely to benefit from compression.

In some examples, the at least one of the instructions is any one of: a gather instruction, a scatter instruction, a contiguous vector load instruction, and a contiguous vector store instruction. Such instructions are typically known to produce large numbers of operations and therefore are likely to benefit from a compression.

Particular embodiments will now be described with reference to the figures.

FIG. 1 schematically illustrates a data processing apparatus 100 in accordance with some embodiments. The apparatus 100 includes fetch stage circuitry 115, which is responsible for fetching instructions from either an instruction cache 105 or a macro-operation cache (mop cache) 110. From here, either the macro-operations or the instructions are passed to decode stage circuitry 120. The instructions pass through a decode queue 135, and from there to one or more decoders 150. In this example, the decoders 150 decode the provided instruction and generate one or more operations, which are degenerated into one or more macro-operations, which are output by the decoders 150. The resulting macro-operations are then passed to a multiplexer 155.

The entries from the macro-operation cache 110 are passed by the fetch stage circuitry 115 to a MR queue (MRQ) 130 and from the MR queue 130 to the previously mentioned multiplexer 155.

In these embodiments, one or more of the entries of the mop cache 110 is a compressed entry. Such entries are expanded by a mopc expander 140 when they are received by the MR queue 130, and the expanded macro-operations are passed to the multiplexer 155. The mopc expander 140 uses lookup circuitry 165. The lookup circuitry 165, in these embodiments, is specific to the mopc expander 140 and provides information on how to expand a compressed entry into one or more macro-operations for that specific mopc expander 140. This process is shown in more detail with respect to FIG. 4.

The multiplexer 155 therefore selects macro-operations from any of the outputs of the decoders 150, the MR queue 130, and the mopc expander 140 and provides the selected macro-operations to a flop 160. The macro-operations are then passed to rename stage circuitry 125 and from there are passed to execution circuits for execution. In addition, the macro-operations from the flop 160 are provided to a fill queue 145, which inserts the macro-operations into the macro-operation cache (mop cache) 110. Accordingly, the decoding performed by the decoders 150 need not be repeated, and instead the resulting macro-operations can be directly provided by the macro-operation cache 110.

Note that this example is concerned with macro-operations. However, the present techniques are equally applicable if the output of the decoders (and the contents of the mop cache 110) were operations or micro-operations.

Some of the instructions may only produce a single macro-operation from the decoders 150. In some cases, multiple macro-operations are produced by the decoders 150 for a single instruction. In some cases, it may be possible to insert the opcodes of all of these macro-operations into a single entry of the mop cache 110. In other cases, so many macro-operations are produced by the decoders 150 for a single instruction, that a compressed entry must be inserted into the mop cache 110. Such entries contain a representation of the macro-operations and are expanded by the mopc expander 140.

Figure 2:
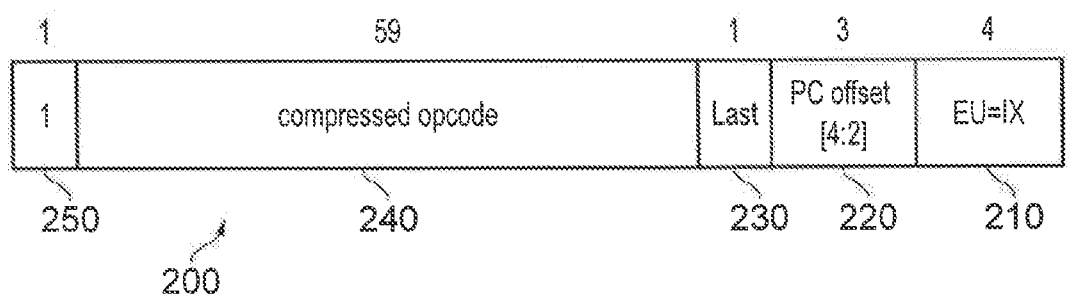
FIG. 2 illustrates a mop-cache entry in accordance with some embodiments.

FIG. 2 illustrates an example of a compressed entry 200 in accordance with some embodiments. In this example, the entry includes an identifier 210 of the execution unit to which the opcodes are directed, which is four bits in length. For the purposes of a compressed entry, the value corresponds with an integer unit (IX). The entry also contains a program counter offset 220; specifically three bits of the program counter value to which the instruction generating these macro-operations is concerned. A single bit 230 is used to indicate whether this is the last mop-cache entry of a sequence of mop-cache entries that all relate to a single instruction. The compressed opcode 240 is then stored in the following 59 bits. It is this compressed opcode 240 that will be used to determine the series of macro-operations that should be generated by the expansion circuitry 140. Finally, a most significant bit (MSB) 250 of '1' is provided.

The combination of the single bit '1' 250 and the specification of the identifier 210 of the execution unit being the integer unit collectively identify the entry as a compressed entry. If one of these is missing—i.e. if the MSB 250 is a '0' or if the execution unit is specified as something other than the integer unit then the entry is not considered to be a compressed entry and will not be decompressed by the mopc expander 140.

Figure 3:
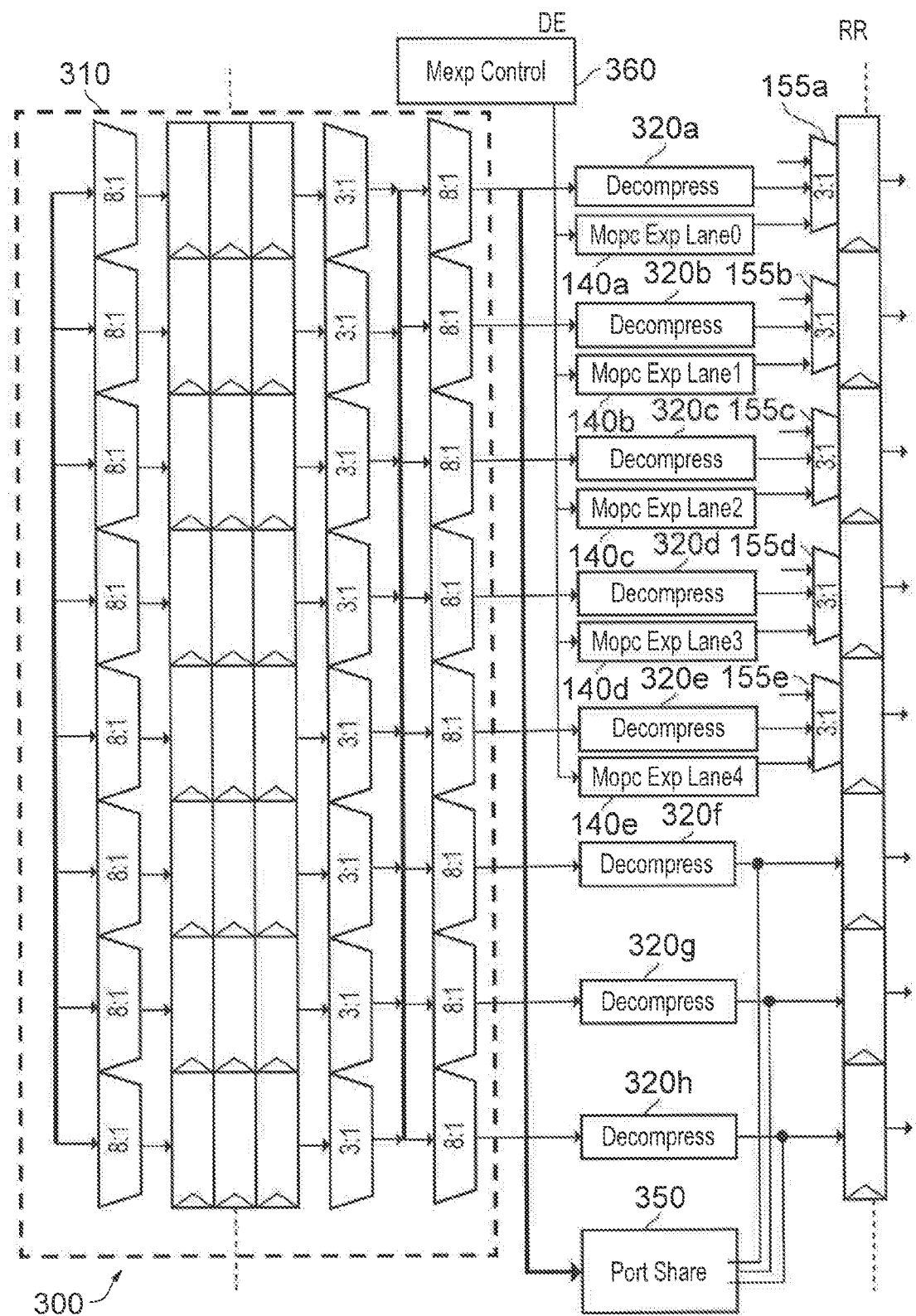
FIG. 3 illustrates an apparatus for performing mop-cache entry expansion in accordance with some embodiments.

FIG. 3 illustrates an apparatus 300 for performing mop cache entry expansion in accordance with some embodiments. The apparatus includes rearrangement circuitry 310 which comprises a series of buses, multiplexers, and flops. This rearrangement circuitry makes it possible for macro-operations having an oldest index to be selected for each bank (using the 3:1 multiplexers) and for the oldest macro-operation to be directed towards lane zero (using the bank multiplexer). In this example, eight lanes are provided, with five of the lines being capable of performing mop expansion. Each of the lanes includes a 3:1 multiplexer 155a, 155b, 155c, 155d, 155e. Each of the multiplexers 155a, 155b, 155c, 155d, 155e takes as inputs: output from the decoders 150, output from regular macro-operations that pass from the MR queue 130 via decompressors 320a, 320b, 320c, 320d, 320e, 320f, 320g, 320h (which take uncompressed mop cache entries and generate decode output), and output from the mopc expanders 140a, 140b, 140c, 140d, 140e. In the case of the bottom three lanes, no multiplexer is provided. This is because the inputs in to the rename stage cannot come from the decoders 150 or from the mopc expanders 140a, 140b, 140c, 140d, 140e. Instead, the inputs to the rename stage in these lanes comes specifically from the MR queue 130 via decompressors 320a, 320b, 320c, 320d, 320e, 320f, 320g, 320h.

Mop expansion control circuitry 360 is used in order to direct the expansion of the compressed entries performed by the mopc expanders 140a, 140b, 140c, 140d, 140e. The outputs of the multiplexers 155 are provided to, for instance, rename stage circuitry 125, via one or more flops. Rename stage circuitry 125 may have a limited ability to perform renaming. In particular, only a certain number of rename operations may take place simultaneously. Consequently port share circuitry 350 is provided to control the extent to which further entries can be inserted into the bottom three lanes. In other words, if the rename circuitry is capable of performing five rename operations in each cycle and if each of the top five lanes has macro-operations inserted that necessitate or may necessitate renaming, then the port share circuitry 350 disallows entries into the bottom three lanes that may also require renaming. If, however, the top five lanes are used for macro-operations that do not require renaming (such as with a branch instruction), then the port share circuitry 350 may allow the insertion into the bottom three lanes of macro-operations regardless of whether they require renaming or not and arbitration can take place in order to use the rename resources of other (earlier) lanes.

Each of the expansion circuits 140a, 140b, 140c, 140d, 140e is specific to its lane. Consequently, the expansion circuits 140a, 140b, 140c, 140d, 140e need not be concerned with expansion that takes place in respect of other lanes.

Figure 4:
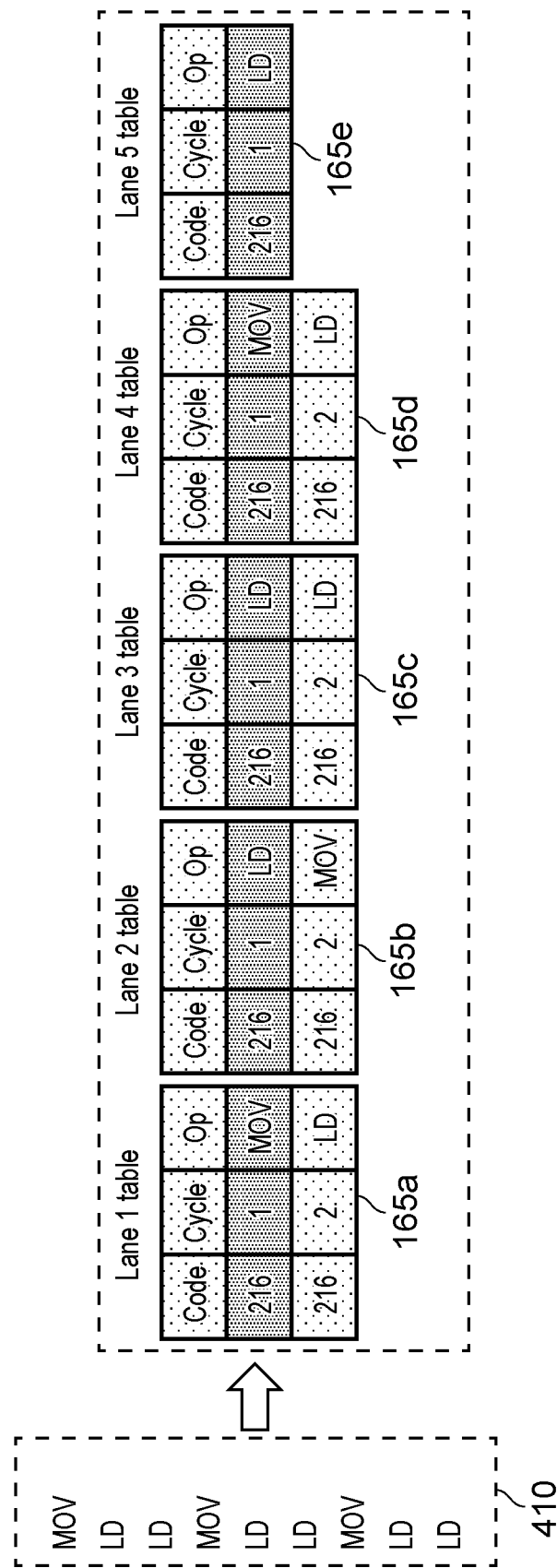
FIG. 4 illustrates mop-cache expansion tables in accordance with some embodiments.

FIG. 4 illustrates the expansion performed by each of the expansion circuits 140a, 140b, 140c, 140d, 140e differs. In particular, FIG. 4 illustrates a sequence of macro-operations 410 that may be generated as a consequence of a gather instruction in which a number of data elements from non contiguous areas of memory are fetched. FIG. 4 also illustrates the lookup tables 165a, 165b, 165c, 165d, 165e corresponding with each expansion circuit 140a, 140b, 140c, 140d, 140e. The lookup tables 165a, 165b, 165c, 165d, 165e indicate, for a given compressed opcode 240 and cycle number, the macro-operation that should be generated.

In this case, the gather instruction is represented by the compressed opcode "216". For this instruction, in this example, a total of nine macro-operations are generated and since expansion can take place only over five different lanes, it is necessary for the expansion to take place over two cycles. Each of the expansion circuits 140 contains a lookup table 165 to indicate the macro-operation that should be generated given the opcode of the compressed entry and the cycle number. Consequently, in a first cycle for this instruction, the first expansion circuitry 140a generates a MOV macro-operation. The second expansion circuitry 140b generates a LD macro-operation, the third expansion circuitry 140c generates an LD macro-operation, the fourth expansion circuitry 140d generates a MOV macro-operation, and the fifth expansion circuitry 140e generates an LD macro-operation. This covers the first five macro-operations of the set of macro-operations 410 for the gather instruction. In a second cycle, the first expansion circuitry 140a generates an LD macro-operation, the second expansion circuitry 140b generates a MOV macro-operation, the third expansion circuitry 140c generates an LD macro-operation, and the fourth expansion circuitry 140d generates an LD macro-operation. No macro-operation is generated in the second cycle by the fifth expansion circuitry 140e. Consequently, it can be appreciated that for a given instruction, the same macro-operations are generated by each of the expansion circuits 140. Furthermore, as a consequence of this, each of the expansion circuits 140 only requires information on how to decompress its own macro-operations for a given instruction. Consequently, the lookup circuitry 160 provided for each of the expansion circuits 140 can be kept small.

Figure 5:
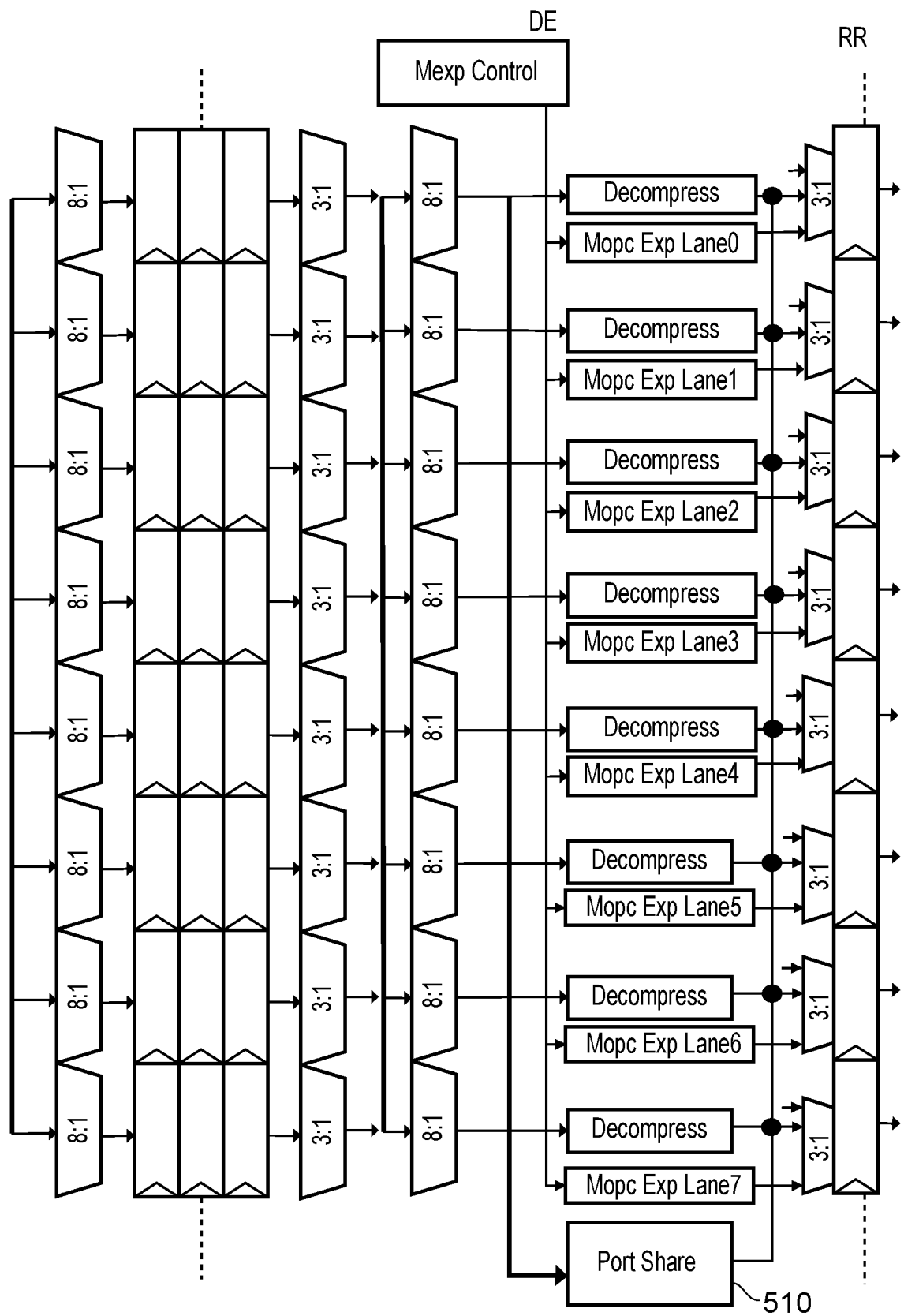
FIG. 5 illustrates an apparatus for performing mop-cache entry expansion in accordance with some embodiments.

FIG. 5 illustrates examples in which all of the lanes are used by expansion circuitry. In this example, since expansion can make use of any number of the lanes, it is also possible for any number of the lanes to be used by macro-operations coming from the MR queue. The port share circuitry 510 must therefore be able to control entry into any of the lanes so that entries into those lanes do not overuse the rename resource when entries are provided at the same time as compressed entries.

In practice, in such embodiments, it is important that the allocation of macro-operations to the lanes for compressed entries also does not overuse resource such as the rename resource. Since the macro-operations relating to an instruction are known, this can be statically analysed and the association of macro-operations to lanes in different cycles can be organised so that the resource is not overused. The process for doing this is simply a matter of scheduling and will be understood by the skilled person.

Note that in the embodiment of FIG. 5, the multiplexers for the bottom three lanes are 2:1 multiplexers. This is because, for those lanes, input is not accepted from the instruction cache via the DQ.

Figure 6:
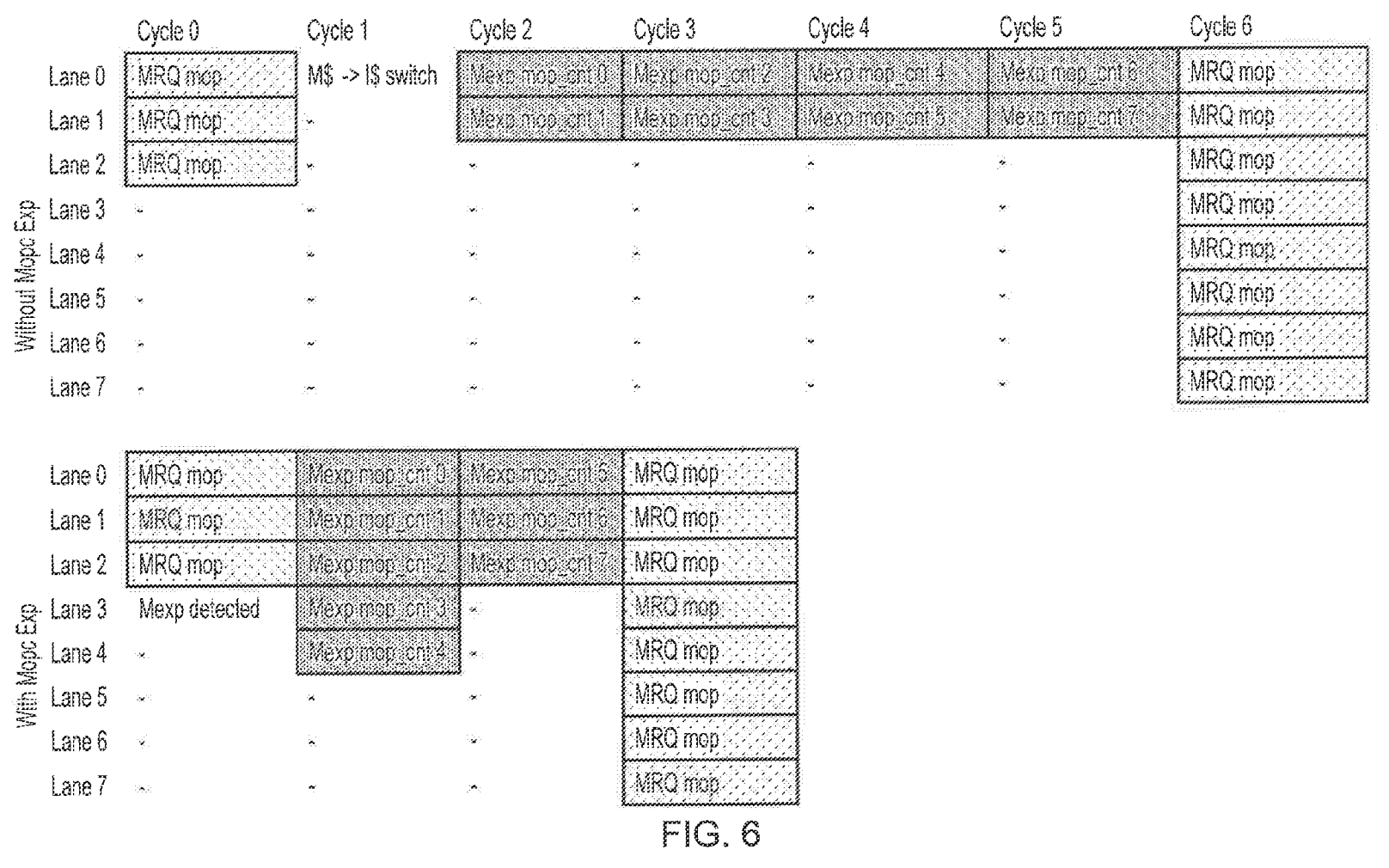

FIG. 6 illustrates the effect of using compressed entries. In this example, a first instruction corresponding to three macro-operations is executed. This is followed by a second instruction that corresponds with eight macro-operations. In this example, it is assumed that a single line of the mop cache can only store six macro-operations. A further two instructions, each degenerating into four macro-operations, then follow.

Without the compressed entries, in a cycle 0, the first three macro-operations are provided from the MR queue. Then, in cycle 1, the 'large' instruction is encountered. Since there are too many macro-operations to store in the mop cache for this instruction, the system must switch from receiving inputs from the macro-operation cache to performing live decoding of the instruction from the instruction cache. Four cycles (2-5) then take place in which two macro-operations per cycle are generated for the instruction. That is to say that, in this example, the decoders 150 have a maximum bandwidth of two macro-operations per cycle. Thereafter, in a cycle six, the last two instructions are executed by receiving macro-operations from the MR queue. Note that, in this example, it is assumed that the pipeline of the macro-operation cache is shorter than the instruction cache, it is not necessary to spend a further cycle switching back to the macro-operation cache.

In contrast, when compressed entries are available, the first cycles proceeds in the same way. However, at the end of the first cycle, the compressed entry is detected. No switch from the macro cache to the instruction cache is necessary since the mop cache can continue to be used. Consequently, in cycle 1, a first decompression of five macro-operations takes place. In cycle 2, a further three macro-operations are expanded. Thereafter, in cycle 4, the remaining two instructions are executed as previously described.

It is therefore demonstrated by the use of compressed entries, for an instruction generating eight macro-operations, three processing cycles are saved. This saving comes about as a consequence of the lower bandwidth restriction from not using the decoders and instruction cache.

Figure 7:
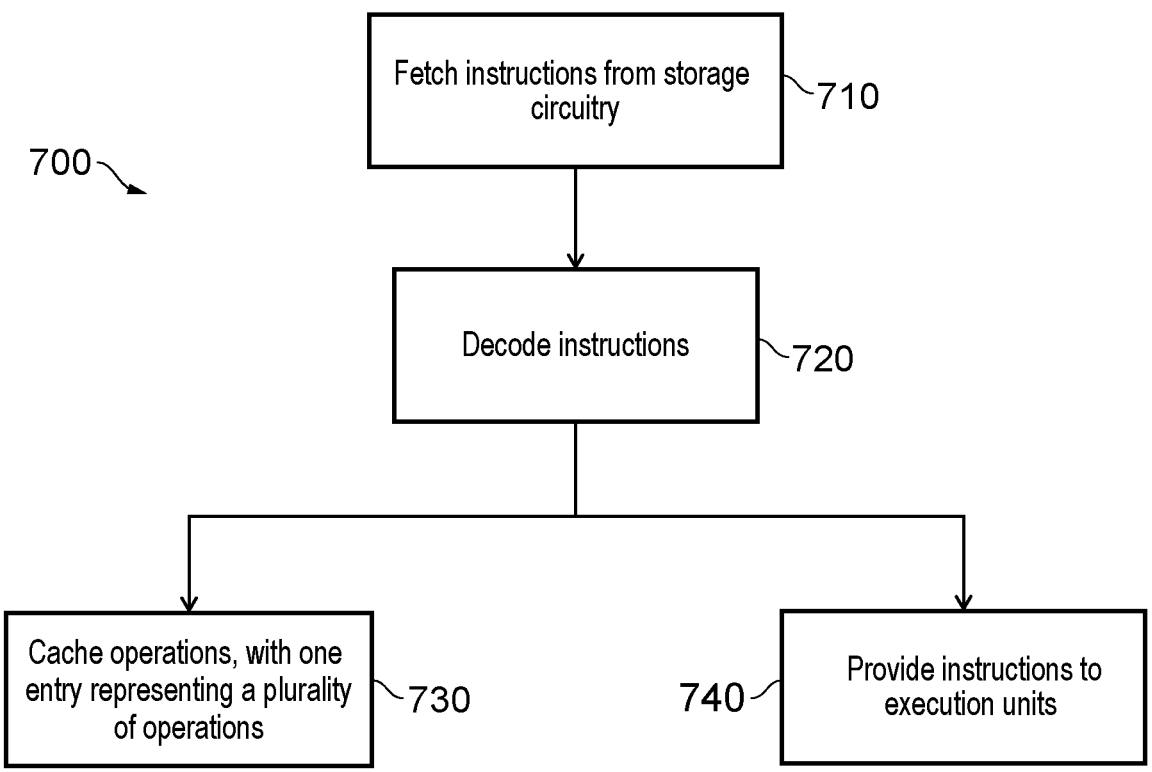
FIG. 7 illustrates a flowchart that shows a method of data processing in accordance with some embodiments.

FIG. 7 illustrates a flow chart 700 that shows a method of data processing in accordance with some embodiments. At a stage 710, instructions are fetched from storage circuitry. At a step 720, the instructions are decoded in order to produce one or more macro-operations. Those instructions are sent to execution units at step 740. Simultaneously or nearly simultaneously, at steps 730, the operations are cached. For instructions generating a number of macro-operations, the cache entry is made in which a single entry represents the plurality of the macro-operations. Phrased differently, for an instruction that generates a plurality of macro-operations, a single entry in the macro-operation cache is generated to represent all of those macro-operations. This is possible even where a line of the cache is only able to store a limited number of macro-operations.

Accordingly, it is demonstrated that the above embodiments, even for instructions that generate a large number of operations, the macro-operation cache can continue to be used by improving decoding performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing method comprising:
fetching instructions from storage circuitry;
decoding each of the instructions into one or more operations, wherein the decoding decodes at least one of the instructions into a plurality of operations;
providing the one or more operations to one or more execution units; and
caching the one or more operations in cache circuitry, wherein at least one entry of the cache circuitry is a compressed entry that represents the plurality of operations, wherein
for each of a plurality of lanes, the compressed entry is expanded into one of the plurality of operations as indicated by an associated lookup table of that lane based on the compressed entry and the one of the plurality of operations is provided to one of the one or more execution units via that lane; and
contents of the associated lookup table differs for at least some of the plurality of lanes for the compressed entry.

2. A data processing apparatus comprising:
fetch circuitry to fetch instructions from storage circuitry;
decode circuitry to decode each of the instructions into one or more operations and to provide the one or more operations to one or more execution units, wherein the decode circuitry is adapted to decode at least one of the instructions into a plurality of operations; and
cache circuitry to cache the one or more operations, wherein
at least one entry of the cache circuitry is a compressed entry that represents the plurality of operations;
a plurality of lanes, each having an associated expansion circuit and an associated lookup table, wherein for each lane, the associated expansion circuit is configured to expand the compressed entry into one of the plurality of operations as indicated by the associated lookup table based on the compressed entry and provide the one of the plurality of operations to one of the one or more execution units via that lane; and
contents of the associated lookup table differs for at least some of the plurality of lanes for the compressed entry.

3. The data processing apparatus according to claim 2, wherein
the operations are macro-operations.

4. The data processing apparatus according to claim 2, wherein
the expansion circuitry inserts each of the plurality of operations into the subset of the plurality of lanes in a predetermined order.

5. The data processing apparatus according to claim 2, wherein
the expansion circuitry inserts each of the plurality of operations into a subset of the plurality of lanes.

6. The data processing apparatus according to claim 5, wherein
the lanes are connected to rename circuitry; and
a size of the subset is defined by a number of rename operations that can be simultaneously performed by the rename circuitry across the lanes.

7. The data processing apparatus according to claim 6, comprising:
control circuitry to control entry to those of the lanes not in the subset according to the number of rename operations that can be simultaneously performed by the rename circuitry and a number of rename operations necessitated by the plurality of operations.

8. The data processing apparatus according to claim 2, wherein
the compressed entry comprises a compressed entry identifier to indicate that the compressed entry is to be expanded by the expansion circuitry; and
the compressed entry comprises a compression opcode that corresponds with the plurality of operations.

9. The data processing apparatus according to claim 2, wherein
the compressed entry comprises opcodes in a compressed form;
wherein the opcodes are opcodes of the plurality of operations.

10. The data processing apparatus according to claim 2, wherein
a length of an uncompressed entry of the cache circuitry is the same as a length of the compressed entry in the cache circuitry.

11. The data processing apparatus according to claim 2, wherein
the at least one of the instructions relates to a plurality of memory locations.

12. The data processing apparatus according to claim 2, wherein
the at least one of the instructions is any one of:
a gather instruction,
a scatter instruction,
a contiguous vector load instruction, and
a contiguous vector store instruction.

* * * * *